US012711396B2

(12) United States Patent
Palatnik de Sousa et al.

(10) Patent No.: US 12,711,396 B2
(45) Date of Patent: Aug. 18, 2026

(54) GRADIENT MASKING ALGORITHM FOR FEDERATED LEARNING PRIVACY

(71) Applicant: Dell Products L.P., Round Rock, TX (US)

(72) Inventors: Iam Palatnik de Sousa, Rio de Janeiro (BR); Isabella Costa Maia, São Paulo (BR); Pablo Nascimento da Silva, Niterói (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 510 days.

(21) Appl. No.: 18/476,123

(22) Filed: Sep. 27, 2023

(65) Prior Publication Data

US 2025/0103903 A1 Mar. 27, 2025

(51) Int. Cl.
*G06N 3/084* (2023.01)
*G06N 3/098* (2023.01)

(52) U.S. Cl.
CPC ............. *G06N 3/098* (2023.01); *G06N 3/084* (2013.01)

(58) Field of Classification Search
CPC ............................... G06N 3/098; G06N 3/084
USPC ........................................................... 706/25
See application file for complete search history.

(56) References Cited

U.S. PATENT DOCUMENTS

2021/0383280 A1* 12/2021 Shaloudegi ............. G06F 17/18

OTHER PUBLICATIONS

Pasquini, Dario, Danilo Francati, and Giuseppe Ateniese. “Eluding Secure Aggregation in Federated Learning via Model Inconsistency.” arXiv preprint arXiv:2111.07380 (2021).

U.S. Appl. No. 17/659,146, filed Apr. 13, 2022.

* cited by examiner

*Primary Examiner* — Jeffery A Williams
(74) *Attorney, Agent, or Firm* — Workman Nydegger

(57) ABSTRACT

Techniques for facilitating masking of gradients produced by a federated learning network are disclosed. A set of masking coefficients is selected. These coefficients are to be tested by a set of nodes in the federated learning network. Each node is assigned a subset of the masking coefficients. The nodes are instructed to use their respectively assigned subsets of masking coefficients to locally perform model inversion testing using locally available datasets. Quantitative output is then received from the nodes. This output is generated as a result of the model inversion testing. The quantitative output is aggregated to produce discrete data groups organized according to the masking coefficients. A particular masking coefficient is then selected for subsequent application against gradients that are generated by the set of nodes.

20 Claims, 7 Drawing Sheets

GRADIENT MASKING ALGORITHM FOR FEDERATED LEARNING PRIVACY

FIELD OF THE INVENTION

Embodiments of the present invention generally relate to selecting a masking coefficient to mask gradient data produced in a federated learning environment. More particularly, at least some embodiments of the invention relate to systems, hardware, software, computer-readable media, and methods for facilitating the selection of a masking coefficient that will be used by nodes in a federated learning environment to mask their underlying gradient data.

BACKGROUND

Federated Learning is a strategy for distributed training of Artificial Intelligence (AI) models. With federated learning, multiple nodes contribute to the training of the AI model using their own separate datasets. Federated learning is particularly relevant with the rise of edge related applications and with the advent of large multicenter or multiorganization collaborations. By collaboratively pooling data and resources from various nodes, as is done with federated learning, it is possible to create much stronger models compared to scenarios where each node trains its own individual AI model.

In many situations, however, it is desirable, or perhaps even mandatory, for these nodes to maintain the privacy of their respective datasets. Some common examples include hospitals with private patient information, cellphones with personal private photos, conversations, and voice recordings. A central concept of federated learning is ensuring privacy during training rounds.

Interestingly, certain attacks can occur where an adversary can use adaptive methods to derive the original training data using only so-called "gradient updates" from a given node. Although solutions based on cryptography have been proposed to counteract these threats, the current state of the art solutions have been shown to be breakable. What is needed, therefore, is an improved technique for facilitating federated learning.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

As mentioned above, adversaries have been able to derive the original training data that is used when performing federated learning via the use of gradient updates. As used herein, the term "gradient" or "gradient update" refers to the rate of change of the output of a neural network's node with respect to that node's input. It is desirable to counteract these threats by preventing malicious entities from being able to derive the node's training data.

That is, there is an incentive to focus on defense mechanisms that protect privacy, even if adversaries potentially have access to unencrypted, raw gradient values. Masking (i.e. a technique for creating a fake, yet still representative, version of a set of data) elements of the gradient is a viable strategy for this defense. Notably, however, as a higher proportion of gradient elements are masked, model performance and training procedure are significantly negatively impacted. In an attempt to alleviate this degradation in performance, classic masking techniques are performed in a random manner.

The disclosed embodiments are directed to techniques that balance performance requirements with privacy requirements. Beneficially, the embodiments are directed to improved, non-random methodologies for efficient determination of the appropriate proportion of elements to be masked. By following the disclosed principles, the embodiments are able to improve privacy while minimizing performance loss.

Federated learning methods are becoming a very useful framework for training distributed and privacy-preserving machine learning models. Inasmuch as numerous systems are now employing federated learning, it is desirable to take advantage of these systems. Beneficially, the disclosed embodiments are able to leverage these models for use with telemetry data obtained from devices and servers. Furthermore, the embodiments are able to use this data without having to look at a client's data. As a further benefit, the embodiments are directed to various security mechanisms that, when employed, protect these models from possible breaches.

Example Architectures

Figure 1:
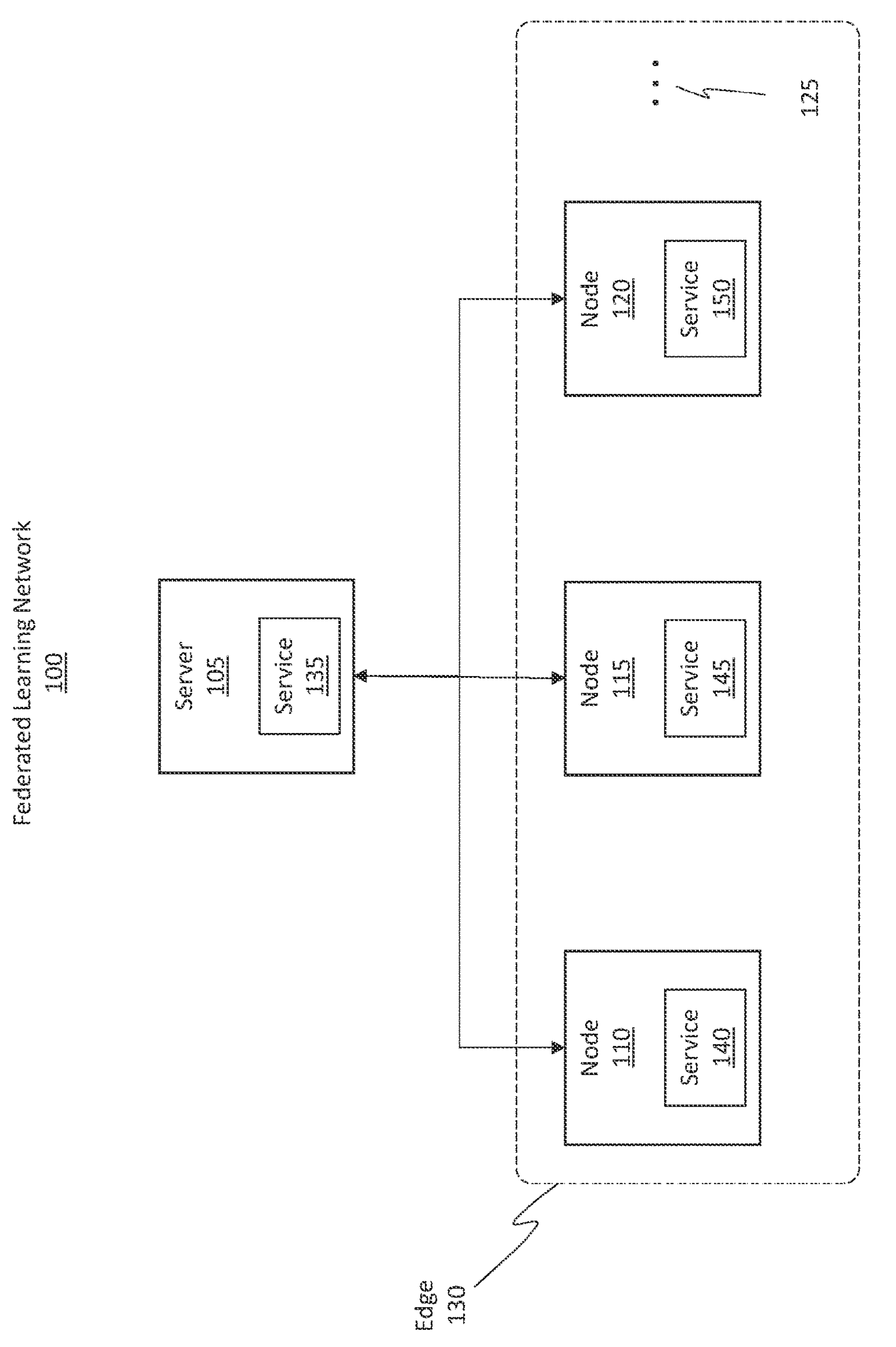
FIG. 1 illustrates an example federated learning network.

Attention will now be directed to FIG. 1, which illustrates an example federated learning network 100 that includes a server 105 and multiple nodes (e.g., node 110, node 115, and node 120). The ellipsis 125 demonstrates how any number of nodes may be included in the federated learning network 100. The nodes are shown as being in the network's edge 130.

Server 105 is shown as including a service 135. As used herein, the term "service" refers to an automated program that is tasked with performing different actions based on input. In some cases, service 135 can be a deterministic service that operates fully given a set of inputs and without a randomization factor. In other cases, service 135 can be or can include a machine learning (ML) or artificial intelligence engine. The ML engine enables service 135 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 135 is a cloud service operating in a cloud environment. In some implementations, service 135 is a local service operating on a local device, such as the server 105. In some implementations, service 135 is a hybrid service that includes a cloud component operating in the cloud and a local component operating on a local device. These two components can communicate with one another.

Service 135 is generally tasked with facilitating the masking of gradients produced by the federated learning network 100. More specifically, service 135 is tasked with selecting a masking coefficient that will be used to perform the masking and then transmitting this masking coefficient to the various nodes. The nodes will then use this masking coefficient to mask the gradients that artificial intelligence (AI) models generate. Notice, in FIG. 1, the various nodes each include their own service. For instance, node 110 includes service 140, node 115 includes service 145, and node 120 includes service 150. The services on these nodes may be tasked with the various operations mentioned herein.

FIG. 1 also shows an AI model 155. In some implementations, the server 105 and the nodes 110, 115, and 120 all use the same underlying AI model 155, and those different nodes may use that AI model on their own local data sets. Thus, in some implementations, each of the nodes may use an instance of the same AI model 155.

Accordingly, in what follows, the scenario of a horizontal federated learning training is described, where multiple nodes and a server share the same model, but each node has a different dataset. In some cases, the samples in each dataset contain the same types of features (e.g., hospitals with different patients but with the same type of medical data from each patient).

Server 105 can, in some implementations, be a system within a company receiving information from multiple nodes. The nodes 110, 115, and 120 may be large systems from other companies, hospitals, universities, or other types of edge devices of various kinds (e.g., mobile phones, automated vehicles, etc.).

Figure 2:
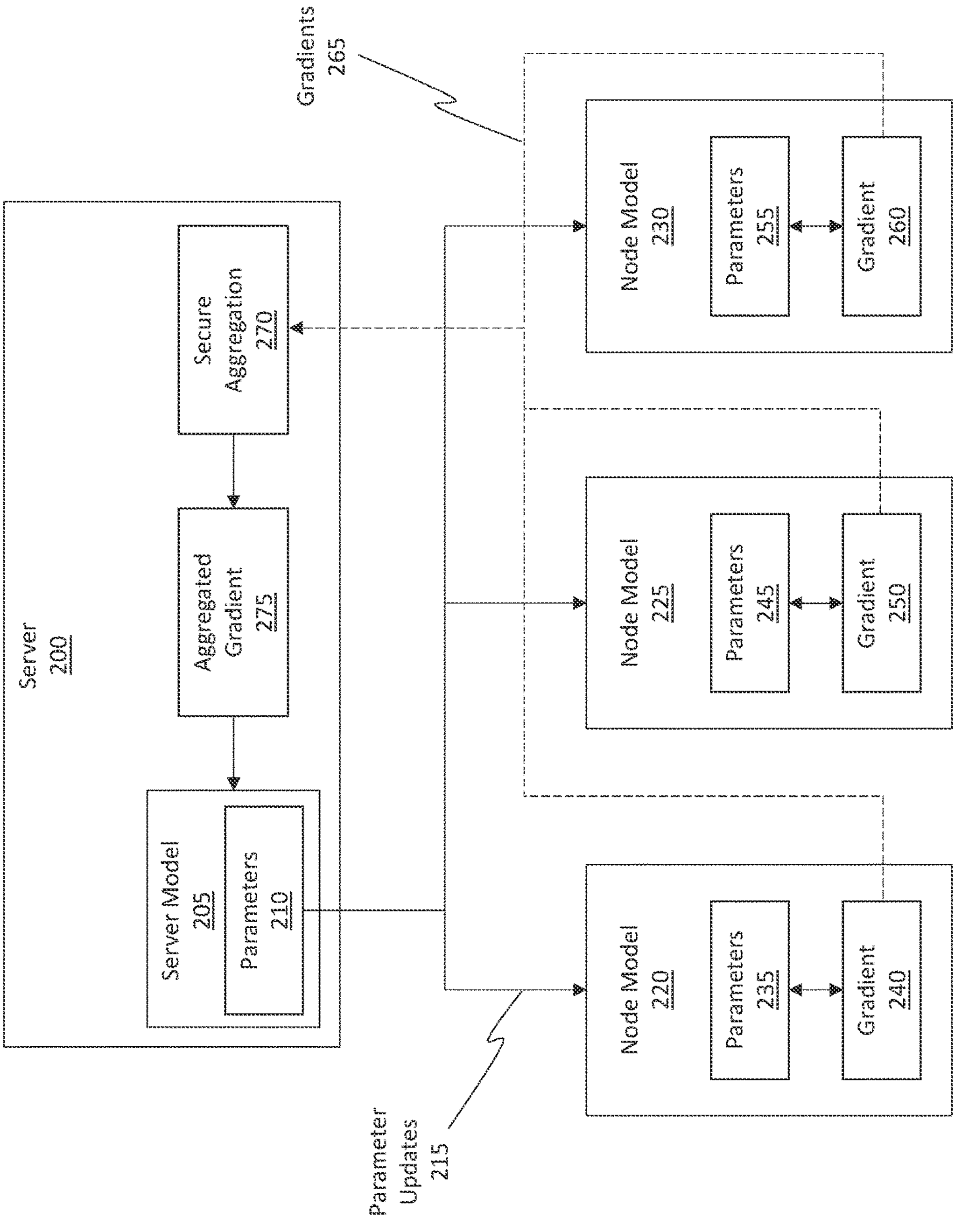
FIG. 2 illustrates further aspects of the federated learning network.

FIG. 2 shows a basic scheme of this type of federated training, where N nodes aggregate their gradient updates using encryption (e.g., Secure Aggregation) before the aggregated update is applied on the server model. To illustrate, FIG. 2 shows a server 200, which is representative of the server 105 from FIG. 1. Server 200 includes a server model 205 (e.g., an example of an AI model), which may include a set of parameters 210.

Server 200 is able to transmit updates to those parameters, as shown by parameter updates 215, to various node models that exist on the nodes, as shown by node model 220, node model 225, and node model 230. Each of these models includes parameters used to generate gradients. To illustrate, node model 220 includes parameters 235, which are used to generate gradient 240. Node model 225 includes parameters 245, which are used to generate gradient 250. Node model 230 includes parameters 255, which are used to generate gradient 260. Those gradients 265 (e.g., gradient 240, 250, and 260) are then transmitted back to the server 200. Server 200 then performs secure aggregation 270 to generate the aggregated gradient 275. Further details on these features will be provided later.

The federated training approach has been developed in an attempt to preserve the privacy of the training data of each node. At any given point of the training, no other nodes have access to each other's training data, and the server has no access to any training data at all.

One underlying assumption for federated learning privacy is that access to indirect representations of the data (e.g., model weights/gradients) cannot be enough for an adversary to reconstruct the private training data. To ensure this premise, three main approaches are taken.

One approach involves encrypting the parameters/gradients using secure aggregation. Another approach involves modifying (e.g., masking) aspects of the training process so that parameters/gradients, even if unencrypted, are not enough for a successful reconstruction. The final approach involves using techniques such as homomorphic encryption. Such techniques, however, demand extra high computational and network resources. The disclosed embodiments are designed to provide efficient methods to ensure privacy is maintained.

Preserving Data Privacy Against Model Inversion Attacks

The first approach mentioned above has been found to include some flaws. For instance, secure aggregation can be broken in various scenarios where the server is adversarial or colludes with adversarial nodes. This type of attack is known as "model Inversion." In other words, by taking appropriate steps, adversaries can still gain access to private training data even when encryption defenses are correctly set up.

The third approach may incur changes to the overall performance of the model. It might not be desirable or advantageous for a given client to participate in federated learning if the final performance of a model is poor enough to hinder deployment. This creates a need for methods to defend against adversarial attacks without incurring great performance costs.

Therefore, because solutions based on the first and third approach have been found to not be sufficient, gradient masking (i.e. the second approach) has been shown to be a viable solution. That is, to achieve both the desired level of protection and the desired performance efficiency, the disclosed embodiments focus on gradient masking. With this approach, a certain percentage of random elements in a gradient array are eliminated. By following this unique approach, the embodiments are able to better preserve privacy and ensure that the datasets and gradients of a node are not susceptible to misuse.

Notably, the disclosed techniques are distinct from traditional drop-out regularization. With those traditional approaches, the weights of a model are randomly turned on or off to regularize model performance and to reduce overfitting. The disclosed solutions presented herein do not operate to modify model weights; rather, the disclosed solutions operate by modifying the values in the gradient array. Thus, one aim of the disclosed embodiments is not to regularize model performance (as in the case of the drop out procedure) but rather to protect against model inversion attacks. Weight drop-out regularization does not attempt to protect against model inversion, yet the disclosed gradient masking is aimed at addressing that problem.

Automating Defense By Selecting the Correct Masking Proportion

The type of defense approach discussed herein has hyperparameters that affect how much privacy and performance are preserved. In this case, too low of a masking proportion means model inversion is still viable. On the other hand, too high of a rate means training performance would deteriorate to a level that is not acceptable.

This above problem is dynamic because gradients tend to become naturally sparser as models converge. In other words, after many epochs of training, several elements of the gradient arrays tend to zero. Thus, some embodiments can use a more relaxed masking proportion during later stages of training as compared to earlier epochs.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
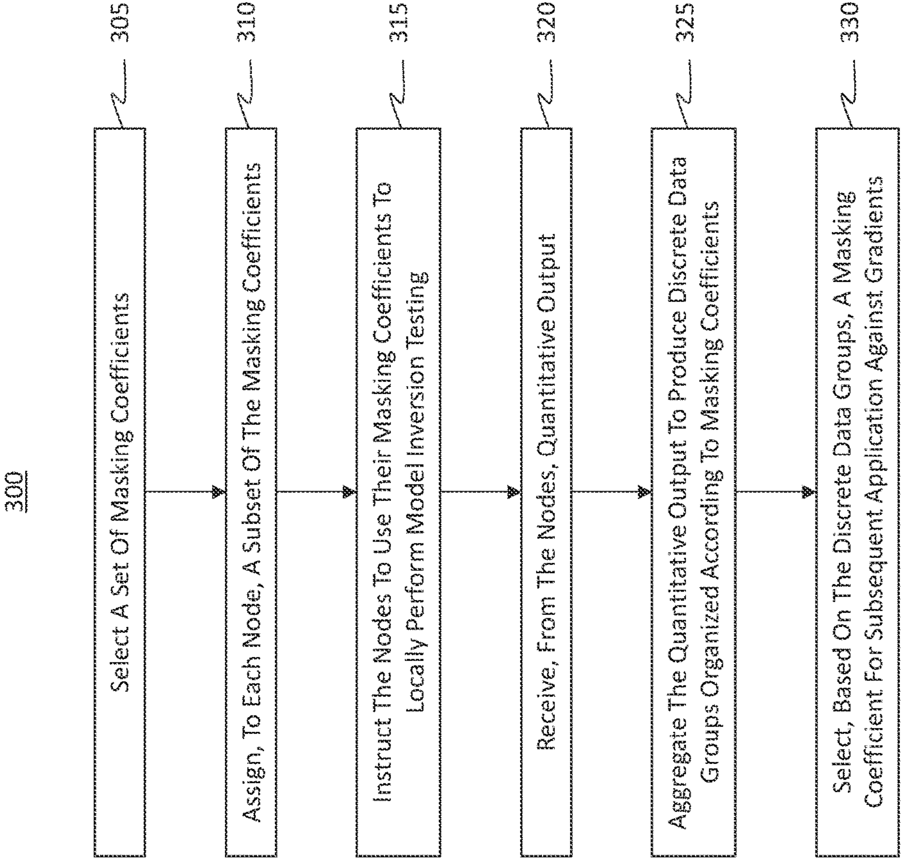
FIG. 3 illustrates a flowchart performed by a server to facilitate the selection of a masking coefficient.
Figure 4:
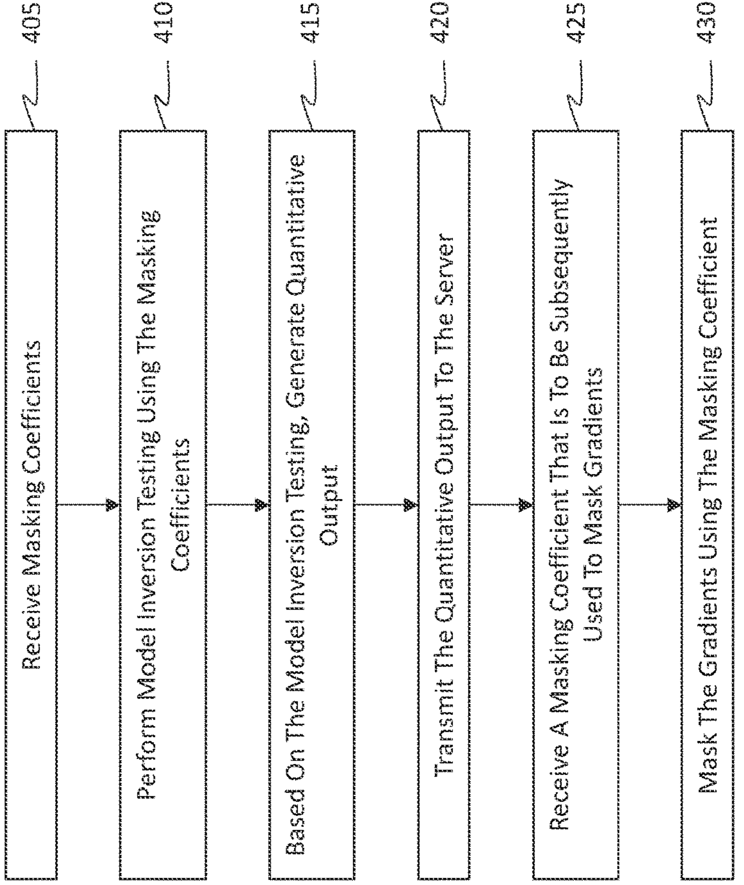
FIG. 4 illustrates a flowchart performed by a node to perform inversion testing.

Attention will now be directed to FIGS. 3 and 4, which illustrate various flowcharts of example methods for facilitating the selection of a masking coefficient and for facilitating the masking of gradients produced by a federated learning network. FIG. 3 shows a method 300 that may be implemented by service 135 of the server 105 shown in FIG. 1. FIG. 4 shows a method 400 that may be implemented by any of the services in the nodes, such as by service 140 of node 110 in FIG. 1. The general operations of the disclosed embodiments will be described with respect to FIGS. 3 and 4. After that discussion, a more detailed description of the operations will be presented.

Method 300 includes an act (act 305) of selecting a set of masking coefficients that are to be tested by a set of nodes in the federated learning network. For instance, these masking coefficients may be tested by the nodes 110, 115, and 120 of FIG. 1. In some implementations, the federated learning network is a horizontal federated learning network. Thus, server 105 of FIG. 1 may be operating in the horizontal federated learning network. Often, the set of masking coefficients include values selected from a range spanning from 0 to 1.0.

In some implementations, the set of masking coefficients are evenly distributed values across a defined interval. In other scenarios, they may not be evenly distributed.

Also, in some cases, the number of masking coefficients included in the set is set to a value that is less than half of a number of nodes included in the set of nodes. In some cases, the number is even smaller, such as less than one quarter of the number of nodes or perhaps even less than ten percent of the number of nodes. In any event, the number of masking coefficients is typically set to a value that is significantly smaller than the number of nodes. In some implementations, the number of masking coefficients is set to a value that represents a diverse level of gradient elimination.

As one specific example, the number of masking coefficients in the subset may be less than 5, less than 4, or even less than 3. The number of nodes may be any value. In some extreme scenarios, the number of nodes is one, and it may be the case that this single node is tasked with performing the coefficient testing. Typically, however, the number of nodes exceeds the value of 1, and the workload of testing the coefficients can be distributed (either equally or unequally) among the nodes. In any event, the number of masking coefficients is used by a pre-defined number of nodes.

Act 310 the includes assigning, to each node in the set, a subset of the masking coefficients. Each masking coefficient in the set of masking coefficients is assigned to at least one node in the set. Stated differently, each masking coefficient is assigned to a least "N" nodes. The value "N" may be defined by an expert, and N>=1. Also, this assigning process includes ensuring that no nodes in the set are assigned duplicate masking coefficients to perform model inversion testing. It will typically be the case, however, that multiple nodes will test the same masking coefficients.

Optionally, the process of assigning the subset of the masking coefficients is based on one or more of: network bandwidth availability; node processor speed; node resource availability; or local dataset size. For instance, different nodes may have different computational abilities. It may be the case that some nodes are assigned more masking coefficients to test than other nodes because some nodes have more computing resources. It may be the case that a network issue exists between the server and one of the nodes, so traffic between those two entities is slow. As a consequence, the embodiments may limit or restrict the number of masking coefficients that is sent to that node. In some scenarios, some nodes may currently be tasked with high priority tasks. Therefore, even though these nodes may have an abundance of resources, these nodes might receive fewer masking coefficients to test so as to ensure priority is given to those other tasks. Accordingly, in some scenarios, the server may be informed as to the operating conditions that the individual nodes are facing, and the server may assign masking coefficients based on that knowledge.

Act 315 includes instructing the nodes in the set to use their respectively assigned subsets of masking coefficients to locally perform model inversion testing using locally available datasets. The process of instructing the nodes in the set to use their respectively assigned subsets of masking coefficients to locally perform model inversion testing involves instructing the nodes in the set to compute effectiveness values for their respectively assigned subsets of masking coefficients.

Act 320 includes receiving, from the nodes in the set, quantitative output. This output is generated as a result of the model inversion testing being performed. In some scenarios, though certainly not all, the quantitative output may be formatted as a structural similarity index (SSIM) (i.e. a measure of how well two units of data can be aligned). Stated differently, the quantitative metric may be a reconstruction metric between inferred data and true data, and the reconstruction metric may be the SSIM.

Act 325 includes aggregating the quantitative output. This aggregation produces discrete data groups organized according to the set of masking coefficients.

Act 330 includes selecting, based on the discrete data groups, a particular masking coefficient. This selected masking coefficient will later be used in a subsequent application against gradients that are generated by the set of nodes. The selected masking coefficient can then be categorized as a hyperparameter.

In some implementations, the process of selecting the particular masking coefficient is performed by identifying (i) whichever data group corresponds with a smallest masking coefficient and (ii) whichever data group is closest to or smaller than a predefined privacy threshold.

Method 300 may further include an act of instructing the nodes in the set to use the selected masking coefficient for subsequent application against gradients that are generated by the set of nodes. The application of the selected masking coefficient determines which proportion of gradients are to be masked.

The subsequent application of the selected masking coefficient involves modification to each local gradient array. Notably, however, it does not involve modification to neural network weights before their updates during backpropagation. For instance, as mentioned previously, it is typically the case that the nodes in the set use instances of the same artificial intelligence (AI) model. Notably, however, the nodes in the set each have a different dataset on which their respective model instances operate.

FIG. 4 shows a flowchart of an example method 400 for facilitating masking of gradients. As discussed above, method 400 may be implemented by a node in the federated learning network, such as node 110. Method 400 will be triggered in response to act 315 in FIG. 3 being performed. That is, method 400 occurs subsequent in time to act 315.

Act 405 includes receiving, from the server in the federated learning network, a set of masking coefficients. Each masking coefficient in the set of masking coefficients is unique. That is, no duplicates exist in the set of masking coefficients.

Act 410 includes performing model inversion testing using the set of masking coefficients. The model inversion testing involves applying the set of masking coefficients to a local dataset.

Based on the model inversion testing, act 415 includes generating quantitative output. This quantitative output may be in the form of an SSIM, as discussed above. Act 420 then includes transmitting the quantitative output to the server.

Act 425 is triggered in response to act 330 from FIG. 3 being performed. That is, act 425 occurs after act 330 is performed. Act 425 includes receiving, from the server, a particular masking coefficient that is to be subsequently used to mask gradients generated by the node.

Act 430 then includes masking the gradients generated by the node using the masking coefficient. In some implementations, this masking coefficient is the same masking coefficient that is used or will be used by other nodes in the federated learning network. Also, the process of masking the gradients involves randomly eliminating a certain percentage of gradient values in the gradient array that is generated by the node.

Further Details

As shown above, the disclosed embodiments are directed to automatic techniques for determining the masking proportion (aka "coefficient" or "masking coefficient") to be used by each node in the federation. The proportion can take values between 0 (i.e. no gradient elements are masked, resulting in all gradients being sent to the server) and 1 (i.e. all gradient elements are masked, resulting in no gradients being sent to the server). This masking proportion is treated as a hyperparameter to be optimized.

Generally, there are two concurrent objectives. One objective involves verifying that privacy is preserved. The other objective involves verifying that performance was not significantly hindered.

In order to achieve the first objective, nodes are tasked with locally performing an inversion test on their own model using their assigned masking coefficients. These nodes then compare the results to their own private training data. The inverted data is compared to the original through similarity metrics. In one specific example discussed herein, the datatype may be that of images, and the similarity metric considered may be the structural similarity index (SSIM). Notably, however, any other measure tailored to identify similarity between data points can be used.

The second objective is monitored through whichever relevant performance metrics are applicable or otherwise available. Using a classification model as an example, it may be the case that the relevant metrics are classification accuracy or cross-entropy loss. Accordingly, the disclosed solutions involve a distributed algorithm for computation of the masking proportion.

Determining the Masking Proportion

As mentioned earlier, each node can operate using its own corresponding dataset. In some cases, it is beneficial to assume that the data in these datasets is independent and identically distributed (IID). The central node in the federation (i.e. the server) may then allow the different nodes to compute the effectiveness of different masking proportion coefficients.

The central node divides an interval (e.g., a [0,1] interval) of possible masking proportions into K values, linearly spaced across that interval. The federation has $\gamma$ client nodes. Typically, there are significantly more nodes than masking proportion values. In other words, $\gamma >> K$.

Figure 5:
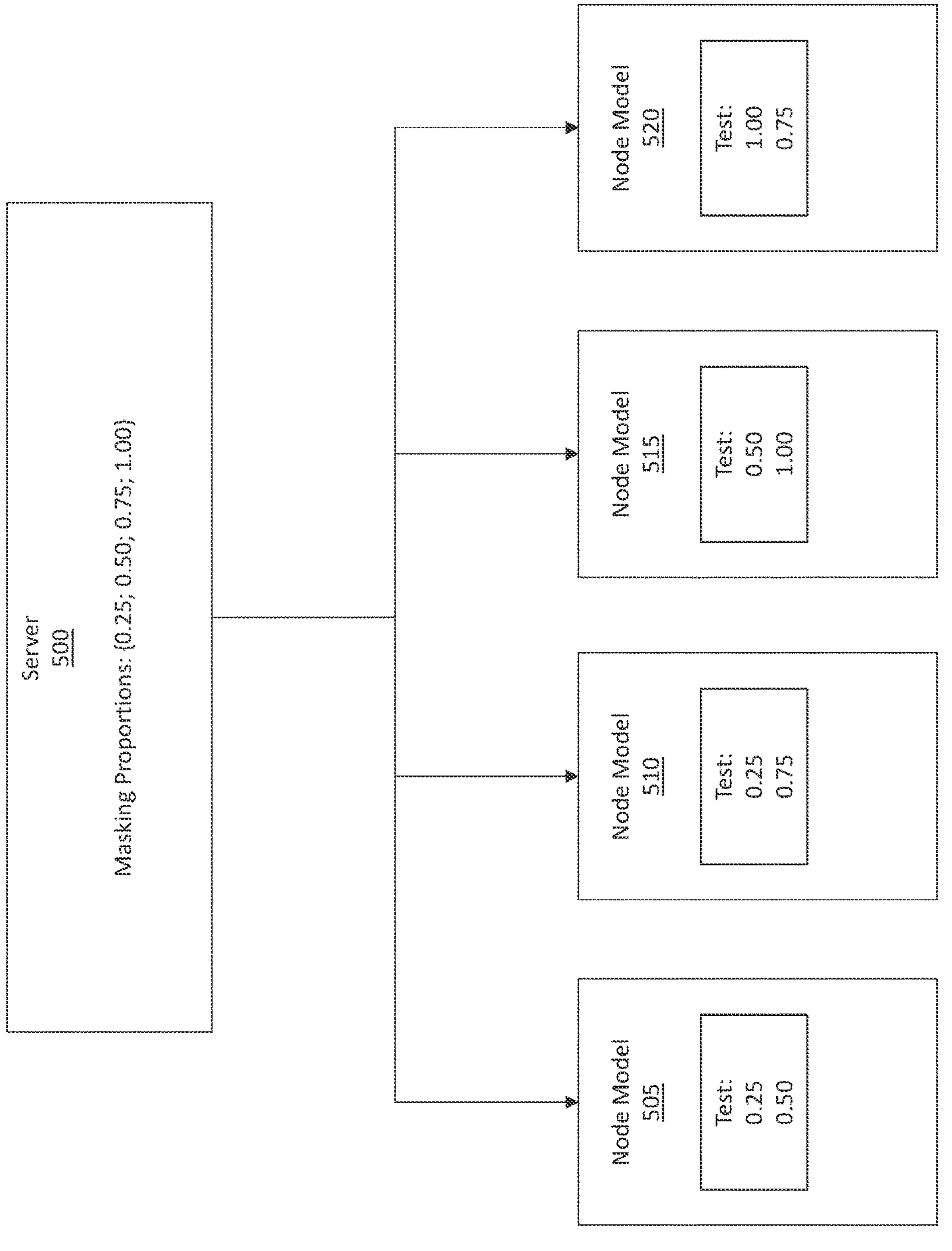
FIG. 5 illustrates how coefficients are assigned to nodes.

The embodiments then randomly assign P different masking proportions to each one of the nodes, constraining this assignment such that each one of the K masking proportion values are assigned to at least N nodes. To this end, the embodiments draw out proportion values at random with replacement. The embodiments further ensure each node does not receive repeated values. FIG. 5 provides one, non-limiting example of these operations.

FIG. 5 shows a server 500, a node model 505, another node model 510, another node model 515, and another node model 520. Server 500 has selected four different masking coefficients, as shown by the following values: 0.25, 0.50, 0.75, and 1.00. Thus, K is 4 in this scenario. P is selected to be 2, meaning that each node will receive two masking coefficients to test. Similarly, each masking coefficient is assigned to at least 2 nodes (i.e. N=2).

In FIG. 5, node model 505 will test the following coefficients: 0.25 and 0.50. Node model 510 will test the following coefficients: 0.25 and 0.75. Node model 515 will test the following coefficients: 0.50 and 1.00. Finally, node model 520 will test the following coefficients: 1.00 and 0.75.

The client nodes will operate as parallel computation elements to efficiently uncover a suitable masking proportion value. In an ideal scenario, it is desirable to have a small P value to spare local node's resources but high enough to guarantee a high N value, giving statistical importance to the privacy that will be computed at a given proportion value.

Each of these nodes performs a model inversion on its own local model, or rather, on its own local dataset, using its assigned masking proportion. These nodes evaluate the quality of the inversion using a quantitative metric (e.g., SSIM).

Figure 6:
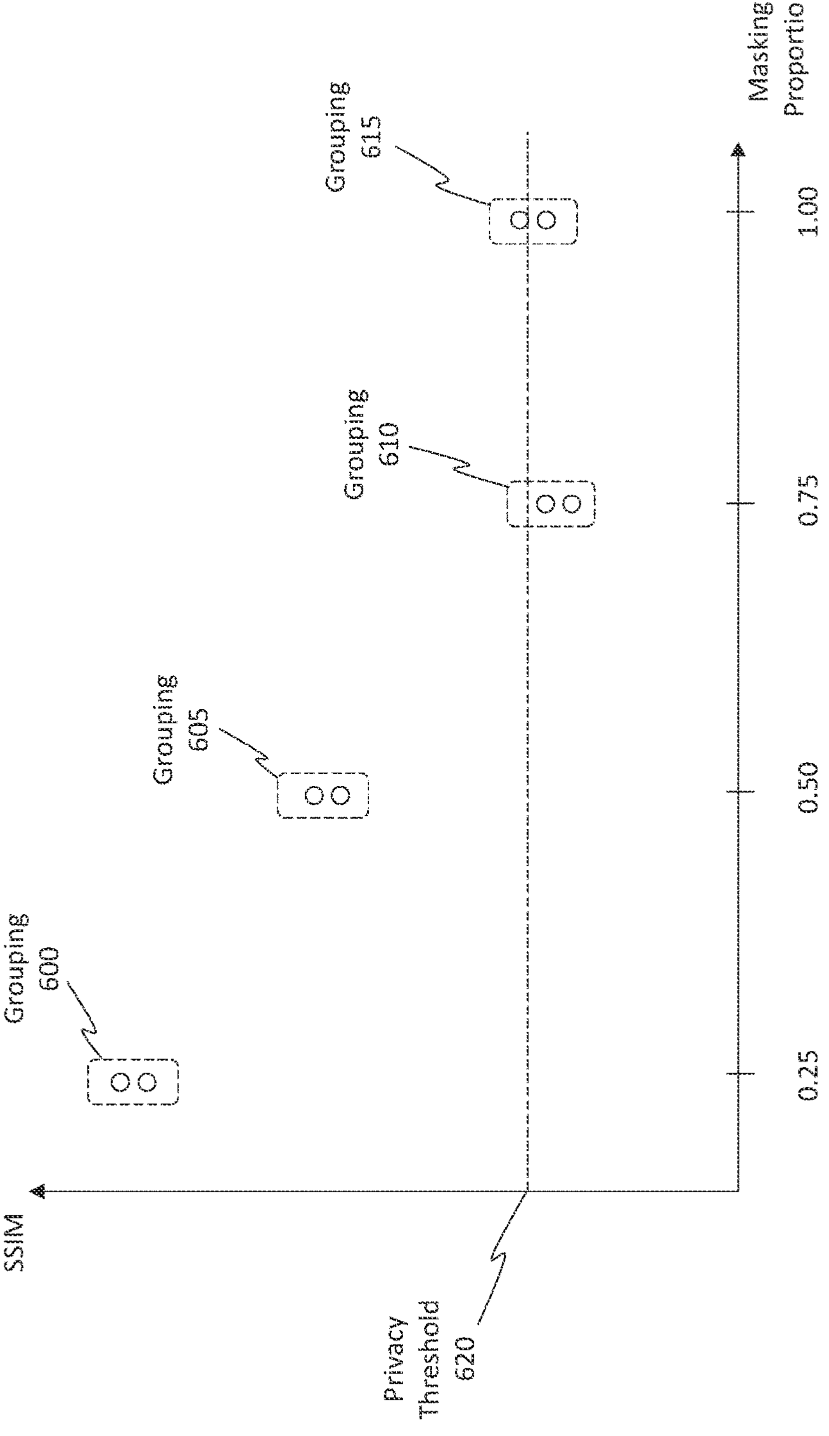
FIG. 6 illustrates an aggregation operation.

In other words, for each of the K masking proportion values, the embodiments will have $T_K$, with $T\_K \geq N$, nodes to compute an inversion metric. The embodiments then calculate an aggregation function per masking proportion value (for instance the Maximum similarity or Minimum privacy). The embodiments will then choose the value closest to a pre-defined privacy threshold. FIG. 6 is illustrative.

FIG. 6 shows how the server is able to receive the quantitative results from the different nodes and then aggregate those results based on the masking coefficients. For instance, FIG. 6 shows four groups, namely, grouping 600 (corresponding to coefficient 0.25), grouping 605 (corresponding to coefficient 0.50), grouping 610 (corresponding to coefficient 0.75), and grouping 615 (corresponding to coefficient 1.00).

Recall, node models 505 and 510 tested coefficient 0.25; node models 505 and 515 tested coefficient 0.50; node models 510 and 520 tested coefficient 0.75; and node models 515 and 520 tested coefficient 1.00. The server received the results for coefficient 0.25 from node models 505 and 510 and aggregated those results, as shown by grouping 600 in FIG. 6. The server received the results for coefficient 0.50 from node models 505 and 515 and aggregated those results, as shown by grouping 605. The server received the results for coefficient 0.75 from node models 510 and 520 and aggregated those results, as shown by grouping 610. Finally, the server received the results for coefficient 1.00 from node models 515 and 520 and aggregated those results, as shown by grouping 615.

It is desirable to find the smallest masking proportion closest to an acceptable level of privacy. In other words, it is desirable to send as many gradients as possible while maintaining a given level of privacy. Given the assumption of approximately IID data, the embodiments can safely pick this masking proportion and expect to maintain a privacy level close to the one obtained in the process above.

The embodiments have also defined a privacy threshold 620. The embodiments are tasked with selecting a coefficient whose test data satisfies the privacy threshold 620. In some cases, the embodiments rely on the maximum similarity or minimum privacy aspect mentioned above.

In the scenario shown in FIG. 6, the embodiments rely on a condition in which the largest test result value for a given coefficient is required to be less than the privacy threshold 620 in order to be considered. In the scenario shown in FIG. 6, only coefficient 0.75 satisfies that requirement. Thus, coefficient 0.75 will be selected, and all of the nodes will use that masking coefficient on their gradients.

Advantageously, since each node will typically receive only a few proportions to test, there is not a significant computational overhead to doing this, compared to normal base federated learning training. Some further optimizations can also be realized. For instance, the embodiments can make the above processes even more efficient by randomly selecting only a subset of images or data on which to optimize for inversion.

Returning to FIG. 6, for each masking proportion, the maximum similarity is computed and compared to a set threshold (e.g., the privacy threshold 620). The lowest masking proportion for which this maximum is below the threshold is taken as the final masking proportion. In this case, coefficient 0.75 is the selected final masking proportion.

Accordingly, the disclosed embodiments provide significant benefits to the technical field of federated learning. These disclosed principles can contribute to the safety and privacy of underlying datasets. Advantageously, the embodiments facilitate automatized masking proportion selection to a satisfactory performance and privacy-preserving federated learning training. The embodiments also facilitate masking proportion selection, which is automated and which does not require heuristic or direct human expert manual adjustments. This allows the hyperparameter to be continually adjusted throughout the federate learning training process. The disclosed techniques take advantage of the federated learning structure to distribute the computation of each masking proportion throughout the nodes, greatly accelerating the process of choosing a masking proportion. Because each node does at most a few model inversion tests, the number of additional inference steps for each node is kept low, which means the disclosed techniques do not result in a significant computational overhead.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
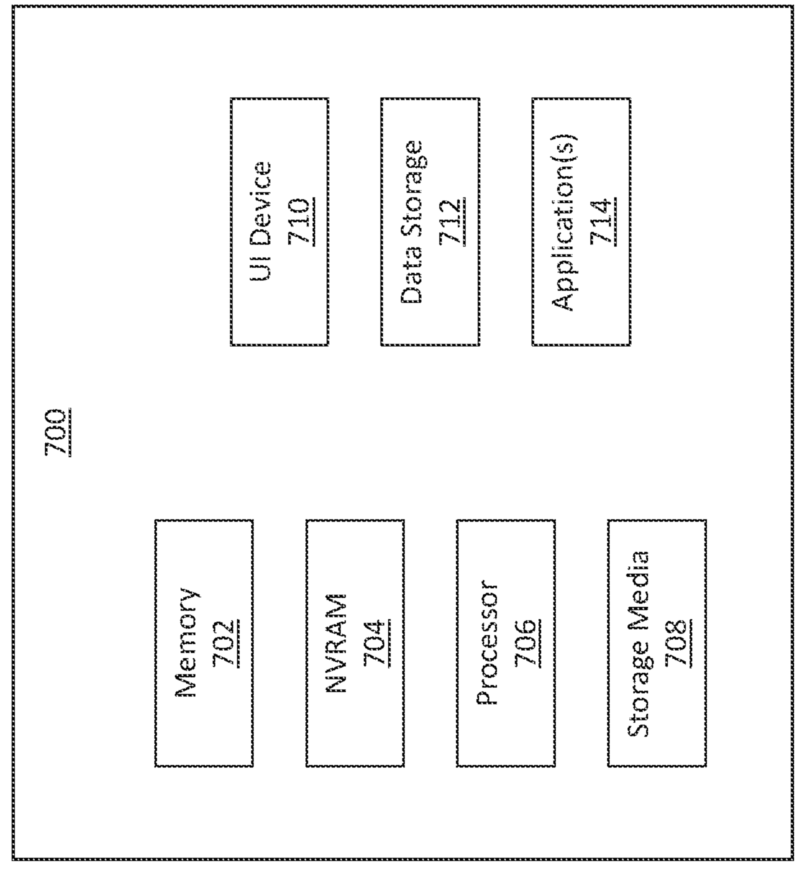
FIG. 7 illustrates an example computer system that can be configured to perform any of the disclosed operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The physical device 700 may also be representative of an edge system, a cloud-based system, a datacenter or portion thereof, or other system or entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

selecting a set of masking coefficients that are to be tested by a set of nodes in a federated learning network;

assigning, to each node in the set, a subset of the masking coefficients, wherein each masking coefficient in the set of masking coefficients is assigned to at least one node in the set;

instructing the nodes in the set to use their respectively assigned subsets of masking coefficients to locally perform model inversion testing using locally available datasets;

receiving, from the nodes in the set, quantitative output that is generated as a result of the model inversion testing being performed;

aggregating the quantitative output to produce discrete data groups organized according to the set of masking coefficients; and selecting, based on the discrete data groups, a particular masking coefficient for subsequent application against gradients that are generated by the set of nodes.

2. The method of claim 1, wherein the federated learning network is a horizontal federated learning network, and wherein the method is performed by a server operating in the horizontal federated learning network.

3. The method of claim 1, wherein the set of masking coefficients are evenly distributed values across a defined interval.

4. The method of claim 1, wherein a number of masking coefficients included in the set of masking coefficients is set to a value that is less than a number of nodes included in the set of nodes.

5. The method of claim 1, wherein assigning the subset of the masking coefficients is based on one or more of: network bandwidth availability; node processor speed; node resource availability; or local dataset size.

6. The method of claim 1, wherein the quantitative output is a reconstruction metric between inferred data and true data, the reconstruction metric being a structural similarity index (SSIM).

7. The method of claim 1, wherein selecting the particular masking coefficient is performed by identifying (i) whichever data group corresponds with a smallest masking coefficient and (ii) whichever data group is smaller than a predefined privacy threshold.

8. The method of claim 1, wherein a number of masking coefficients in the subset of masking coefficients is used by a pre-defined number of nodes.

9. The method of claim 1, wherein the method further includes instructing the nodes in the set to use the selected masking coefficient for subsequent application against gradients that are generated by the set of nodes.

10. The method of claim 1, wherein application of the selected masking coefficient determines which proportion of gradients are to be masked.

11. The method of claim 1, wherein the nodes in the set use instances of a same artificial intelligence (AI) model, and wherein the nodes in the set each have a different dataset on which their respective model instances operate.

12. A server system comprising:

one or more processors; and one or more hardware storage devices that store instructions that are executable by the one or more processors to cause the server system to:

select a set of masking coefficients that are to be tested by a set of nodes in a federated learning network;
assign, to each node in the set, a subset of the masking coefficients, wherein each masking coefficient in the set of masking coefficients is assigned to at least one node in the set;
instruct the nodes in the set to use their respectively assigned subsets of masking coefficients to locally perform model inversion testing using locally available datasets;
receive, from the nodes in the set, quantitative output that is generated as a result of the model inversion testing being performed;
aggregate the quantitative output to produce discrete data groups organized according to the set of masking coefficients; and
select, based on the discrete data groups, a particular masking coefficient for subsequent application against gradients that are generated by the set of nodes.

13. The server system of claim 12, wherein subsequent application of the selected masking coefficient involves modification to each local gradient array but does not involve modification to neural network weights before their updates during backpropagation.

14. The server system of claim 12, wherein the set of masking coefficients are values selected from a range spanning from 0 to 1.0.

15. The server system of claim 12, wherein the selected masking coefficient is a hyperparameter.

16. The server system of claim 12, wherein instructing the nodes in the set to use their respectively assigned subsets of masking coefficients to locally perform model inversion testing involves instructing the nodes in the set to compute effectiveness values for their respectively assigned subsets of masking coefficients.

17. The server system of claim 12, wherein said assigning includes ensuring that no nodes in the set are assigned duplicate masking coefficients to perform model inversion testing.

18. A method comprising:
receiving, from a server in a federated learning network, a set of masking coefficients, wherein each masking coefficient in the set of masking coefficients is unique such that no duplicates exist in the set of masking coefficients;
performing model inversion testing using the set of masking coefficients, wherein the model inversion testing involves applying the set of masking coefficients to a local dataset;
based on the model inversion testing, generating quantitative output;
transmitting the quantitative output to the server;
receiving, from the server, a particular masking coefficient that is to be subsequently used to mask gradients generated by the node; and
masking the gradients generated by the node using the particular masking coefficient.

19. The method of claim 18, wherein the particular masking coefficient is a same masking coefficient that is used by other nodes in the federated learning network.

20. The method of claim 18, wherein masking the gradients involves randomly eliminating a certain percentage of gradient values in a gradient array generated by the node.

* * * * *